July 3, 1962  L. G. SIMJIAN  3,042,920
DEPOSITORY MACHINE COMBINED WITH CAMERA MEANS
Original Filed Nov. 1, 1957  5 Sheets-Sheet 1

INVENTOR.
LUTHER G. SIMJIAN
BY
AGENT.

July 3, 1962 L. G. SIMJIAN 3,042,920
DEPOSITORY MACHINE COMBINED WITH CAMERA MEANS
Original Filed Nov. 1, 1957 5 Sheets-Sheet 2

INVENTOR.
LUTHER G. SIMJIAN
BY
AGENT.

July 3, 1962 L. G. SIMJIAN 3,042,920
DEPOSITORY MACHINE COMBINED WITH CAMERA MEANS
Original Filed Nov. 1, 1957 5 Sheets-Sheet 3

INVENTOR.
LUTHER G. SIMJIAN
BY
AGENT.

July 3, 1962  L. G. SIMJIAN  3,042,920
DEPOSITORY MACHINE COMBINED WITH CAMERA MEANS
Original Filed Nov. 1, 1957  5 Sheets-Sheet 4
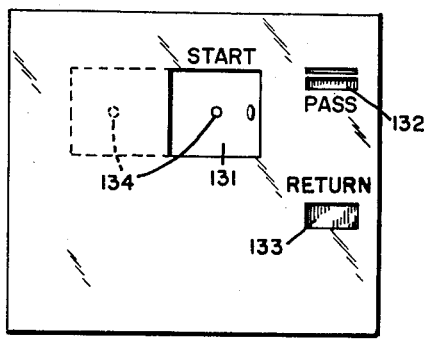
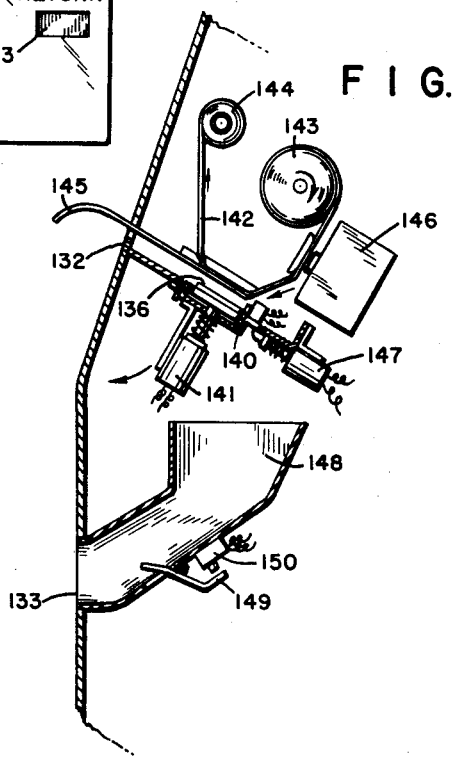
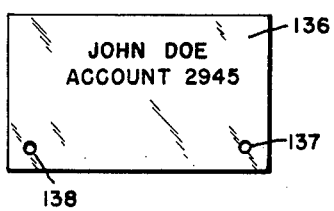
INVENTOR.
LUTHER G. SIMJIAN
BY
Ervin B. Steinberg
AGENT.

July 3, 1962 L. G. SIMJIAN 3,042,920
DEPOSITORY MACHINE COMBINED WITH CAMERA MEANS
Original Filed Nov. 1, 1957 5 Sheets-Sheet 5

INVENTOR.
LUTHER G. SIMJIAN
BY
Erwin B. Steinberg
AGENT.

United States Patent Office 3,042,920
Patented July 3, 1962

3,042,920
DEPOSITORY MACHINE COMBINED WITH
CAMERA MEANS
Luther G. Simjian, Greenwich, Conn., assignor to Universal Match Corporation, Ferguson, Mo., a corporation of Delaware
Original application Nov. 1, 1957, Ser. No. 693,986, now Patent No. 2,936,684, dated May 17, 1960. Divided and this application Mar. 18, 1960, Ser. No. 15,851
3 Claims. (Cl. 346—22)

This application is a divisional application of my co-pending application for U.S. Letters Patent, Serial No. 693,986, filed November 1, 1957, now U.S. Patent 2,936,-684 issued May 17, 1960.

This invention in general, relates to automatic machines for depositing an article of value and refers in a more specific sense to a machine which is adapted to accept checks or money and issues a deposit slip in return for the deposit. Particularly, the machine is adapted to accept checks, paper and coin money, to record an image of the article deposited and to return to the depositor a deposit receipt which is identifiable with respect to the article deposited as well as with respect to the recorded image of the article.

Quite specifically, the depository machine according to the present invention is equipped with camera means to render a permanent record of the actual article deposited. In addition, the machine supplies an identification symbol, such as a transaction number and date stamp, in associated identifiable relationship with said record and includes means for returning to the depositor a deposit slip which is correlated with the deposit and the record. Hence, the deposit slip is suited as a documentary proof of the deposit.

In its simplest embodiment, the depositor inserts the article to be deposited such as money into the machine. In one form of the invention the depositor also inserts a dual deposit slip into the machine. Upon starting of the machine, the deposit slip is stamped with a date and transaction number and the slip is moved together with the money deposited in a position for photography by camera means disposed within the machine. After a photographic exposure has been made, the dual deposit slip is severed and the money and one portion of the deposit slip is moved to a receptacle within the machine, while the other portion of the deposit slip is returned to the depositor.

It will be apparent that when the machine is emptied by a collecting service or by agents of the bank, store, or similar institution, there will be found in the receptacle within the machine a money deposit together with a transaction deposit slip. This deposit slip may carry a notation of the amount of money deposited by the depositor and if this amount coincides with the actual amount, the film exposure need not be developed. In the event of discrepancy, the film readily can be developed and questions of discrepancy are resolved in an easy manner. The machine is provided also with means to maintain individual depository transactions separate from succeeding deposits.

In an alternate embodiment of the invention, the machine is provided with pass means in order to assure that only authorized persons use the machine.

In another and alternate embodiment, control means for starting the machine are so arranged as to be available to a depositor only when a deposit inserted in the machine is no longer accessible for withdrawal therefrom.

One of the objects of this invention therefore is the provision of a depository machine combined with camera means adapted to accept paper money, coin money, checks and similar articles.

Another object of this invention is the provision of a depository machine which is usable for depositing money, for paying bills, for payment of installment payments, etc.

Another object of this invention is the provision of a depository machine which may be frequented by the public when payment offices are closed or when banking services are unavailable.

Another and further object of this machine is the provision of a depository apparatus which can be installed in offices, plants, factories, and many other public places for depositing money and for payment of bills.

Further and other objects of the present invention will become apparent from the following description taken in conjunction with the accompanying drawings in which:

FIGURE 8 is a front view of the depository machine incorporating certain modifications;

FIGURE 9 is a plan view illustrating a typical pass plate means usable in conjunction with the modified machine;

FIGURE 10 is a side view of FIGURE 9;

FIGURE 11 is a view in vertical section showing the location and cooperation of certain elements used in conjunction with the pass plate means per FIGURES 9 and 10.

Figure 1:
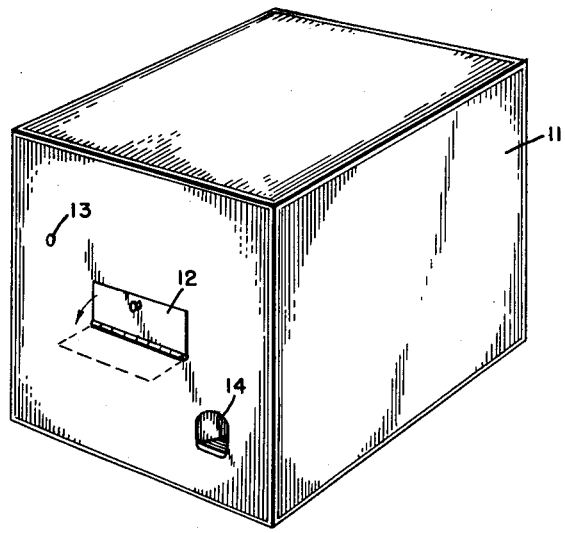
FIGURE 1 is a perspective view of the front panel and side of the depository machine.

Referring to the figures and FIGURE 1 in particular, a housing 11 contains substantially all of the necessary functional elements of the depositing machine. A person desiring to operate the machine will be required to open a hinged access cover 12 and slide out a tray normally concealed behind cover 12. After the article to be deposited has been put on the tray or slide, the slide is pushed in, cover 12 is closed, and a start pushbutton 13 is depressed. The depositor in due course obtains a receipt of the deposit via chute 14. Either the slide or cover 12, or both, are provided with an interlock mechanism so that when the machine is in operation after depressing pushbutton 13, the article deposited becomes inaccessible to the depositor. Conversely, provisions are made to prevent starting of the machine unless the slide is in its "in" position and cover 12 is closed.

Figure 2:
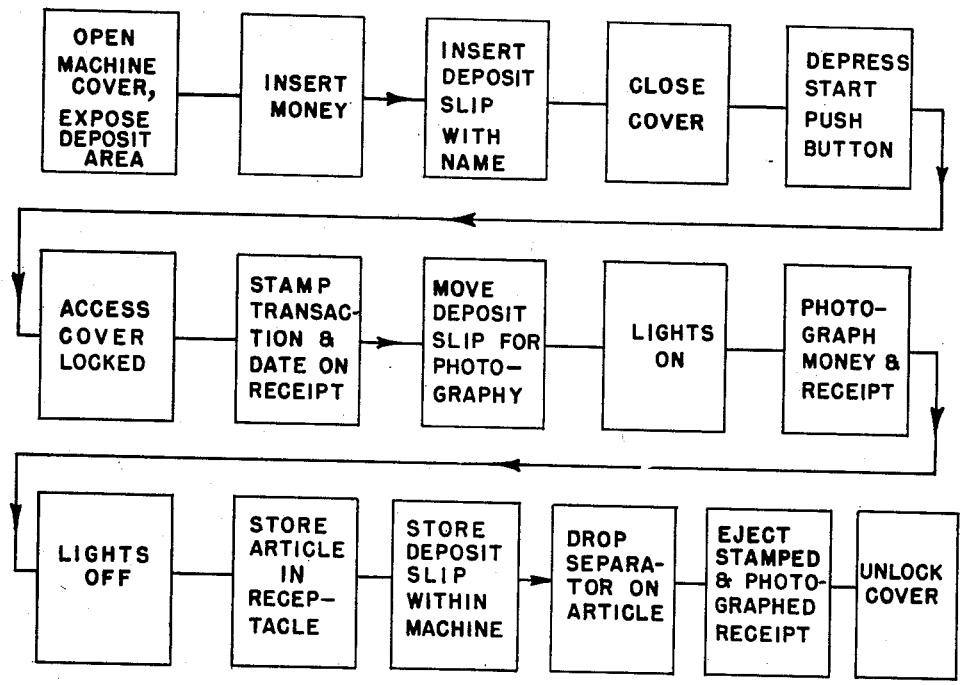
FIGURE 2 is a flow diagram in block form of the sequence and operations taking place when the machine is in operation.

The individual steps and the timing sequence for accomplishing the aims of the machine are presented schematically in block form in FIGURE 2. As a first step the depositor desiring to use the machine is required to open a cover or access door and expose a deposit area which is adapted to receive the article to be deposited, such as money. The depositor may be required to use special identification or pass means which unlock the machine such as a pass key or a special plate with key means similar to charge account plates employed by many department stores and gasoline stations in order to render the machine operative. As a next step the depositor will insert his article, such as money, into the machine on a suitable tray or slide, etc. The depositor may also be requested to insert a deposit slip carrying his name and such other information as may be desired into the machine. In an alternate design and as a variation, a deposit slip may issue to the depositor from within the machine without the depositor being required to insert such a deposit slip. Next, the slide is pushed into the machine, the cover is closed and the start pushbutton is depressed, the machine thus being started. Subsequently the access cover becomes locked so that the deposit can no longer be removed from the machine. Next, the deposit slip inserted into the machine or the deposit slip to be ejected from the machine is imprinted or stamped with a transaction number, a date and such other information as may be desirable. The deposit slip, after having been equipped with identifying means, is then moved into a position for photography. Following the diagram, it will be observed that, consecutively, lights become energized to illuminate the article deposited as well as the deposit slip, a photographic exposure is taken of the money and of the printed deposit slip, and the lights become de-energized. Next, the article or money is deposited into a receptacle disposed within the machine for storage, a portion of the deposit slip is stored with the article and a separator is placed on top of the money and of the deposit slip in order to separate the deposit just accomplished from a succeeding deposit. In the next step, a remaining portion of the deposit slip is returned to the depositor and finally the access cover becomes unlocked which completes the cycle for one depositing operation. It will be noted that in the typical and preferred embodiment described above, the article has been photographed in associated relationhip with a deposit slip, secondly, that the article has been received in a receptacle together with a portion of the deposit slip to identify the article and the deposit with respect to one another, and thirdly, that a stamped receipt has been issued to the depositor to give the depositor a record of his deposit. The depositor thus holds a receipt which is correlated with respect to the photograph and with the deposit.

Under normal circumstances the film need not be developed since a deposit slip can be found with each deposit and a duplicate of the deposit slip is ejected to the depositor. However, in the event of discrepancy the film can readily be developed and since the image of the article is photographed in associated identifiable relationship with the image of the deposit slip, the deposit can readily be checked by scanning the film for the applicable identifying number, code or symbol appearing on the deposit slip.

Figure 3:
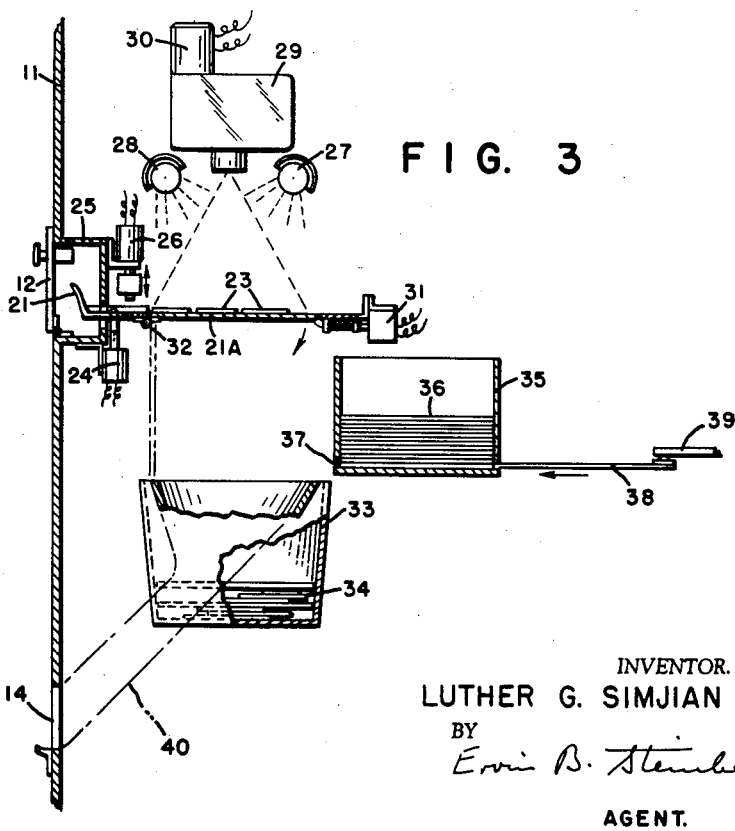
FIGURE 3 is a view in vertical section, partially schematic, of a typical embodiment of the machine, illustrating some of the active elements.

FIGURE 3 illustrates some of the elements employed in achieving the sequential steps described above. The access cover 12 conceals a tray or slide 21 which is adapted to support a plurality of articles 23 to be deposited within the machine. These articles which are money bills and a deposit slip are shown so positioned that photographing them will present proof as to the nature of the deposit. Thus, if a large number of bills is used, the bills may be placed in overlapping position as long as they are in such position as to be identified. The slide has a center panel 21A which is hingedly mounted in the slide 21 and upon which the articles 23 are placed. The slide with panel is extendable out of the machine for placing thereupon the money or article and must be pushed back into the machine before the access cover can be closed. When the machine is started, a solenoid plunger and latch combination 24 engages an aperture of the slide and retains the slide in its inward position. A protective baffle 25 prevents the depositor from gaining access to the inside of the machine. A stamping device 26, electrically operated, is adapted to stamp a serial number, date and other desirable information on the deposit slip. This device is suspended from the baffle and is actuated by a snap acting switch, commonly known as "Micro-Switch," when the slide is pushed into the machine. Two illuminating lamps 27 and 28 are mounted above the slide to illuminate the article and the deposit slip for photography by camera 29, the shutter of which is solenoid operated (not shown) and which is equipped with a motor 30 for advancing the film. Cameras of this type are well known in the art. As soon as an exposure has been taken by camera 29, the article or money 23 is ready for storage within the machine. To this end, solenoid and latch combination 31 is energized which causes the panel 21A to pivot about hinge 32 thereby causing the articles or bills and deposit slip 23 to fall into a receptacle 33 which may contain prior deposits, for instance article 34 or a group of articles or deposits. After the articles 23 have dropped into receptacle 33 it will be desirable to separate this new deposit from the next succeeding deposit which may be made by an entirely different depositor. For this purpose a container 35 is disposed to the side and slightly above receptacle 33. This container contains a plurality of flat separators such as cut sheets of cardboard 36, these sheets being dispensed via aperture 37 by a feeder slide 38 which is operated by a solenoid and plunger combination 39. During each forward stroke of plunger 39 in the direction of the arrow, feeder slide 38 advances and pushes a single separator out of aperture 37 and causes the separator to fall into receptacle 33. This acts to compartmentize a particular deposit. A portion of the deposit slip which has been severed by a knife (FIGURE 4) drops, when panel 21A is released, into chute 40 and is ejected to the depositor at chute terminal 14.

Figure 4:
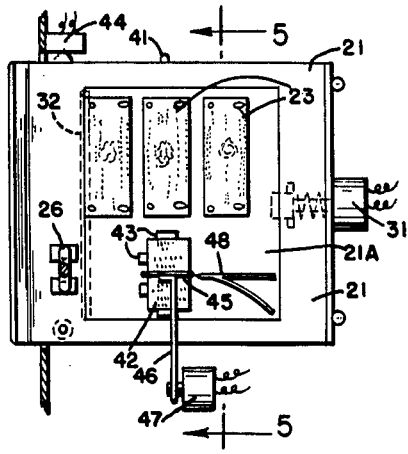
FIGURE 4 is a plan view, partly schematic, of the elements necessary to accept the articles to be deposited.

A plan view of this arrangement and the additional elements necessary are apparent in FIGURE 4 depicting for instance three paper bills 23 positioned on the panel 21A. A dual ticket 42 is shown disposed on the slide, and its location is indexed by means of several locating blocks 43. The dual ticket is illustrated more closely in FIGURE 6 which shows two ticket portions, one portion 42A remaining and being stored with the deposit and a lower portion 42B being returned to the depositor. Both ticket portions are stamped simultaneously, with a date and a transaction number for instance, and prior to placing the deposit slip on the slide the depositor may be requested to sign his name and address or account number on both portions of the ticket. It will be noted that in the present arrangement the money 23 as well as the ticket 42 are in view of the lens of the camera so that the deposit and the identifying deposit slip are photographed by the camera in associated identifiable relationship with respect to one another.

The printing device 26 is actuated by a convex embossing 41 attached to the slide 21. This embossing comes in contact with a stationary toggle switch 44 when the slide is moved in and out of the apparatus. Switch 44 is a momentary contact switch and causes energizing of the printing device 26 when the slide is moved into the machine, that is when a ticket has been placed on the slide by the depositor. This action causes the toggle of the switch to assume its actuated position and when the slide is withdrawn, i.e. when the slide is moved to its outward position, the toggle is caused to assume its cocked position thereby resetting the switch for momentary contact. Severing of the upper and lower deposit slip portions from one another is accomplished by a knife blade 45 attached via holder 46 to a rotary solenoid 47. Normally the knife is maintained in its raised position. Dropping of the hinged panel 21A about the axis of hinge 32 is accomplished by withdrawing the latch and plunger combination inserted in solenoid 31 upon energizing the solenoid.

Figure 5:
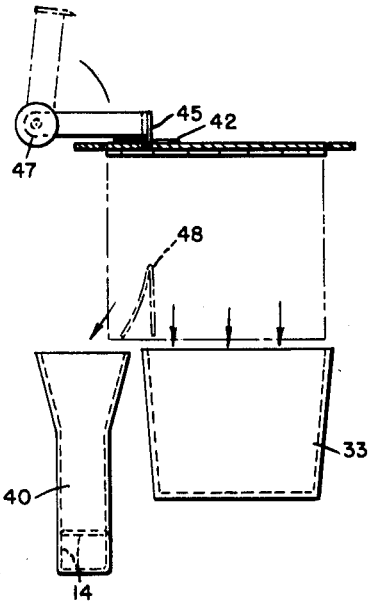
FIGURE 5 is a sectional view of FIGURE 4 along lines 5—5.

FIGURE 5 shows a cross-sectional view at line 5—5 of FIGURE 4 and illustrates the arrangement of the receptacle 33 relative to the chute 40 with guide means 48 adapted to separate the upper half of the deposit slip from the lower half for storage with the article deposited and causing the lower half of the slip to be returned to the depositor via chute 40. Rotary solenoid 47 which operates the knife 45 is depicted in its actuated and cutting position, cutting deposit slip 42.

Figure 7:
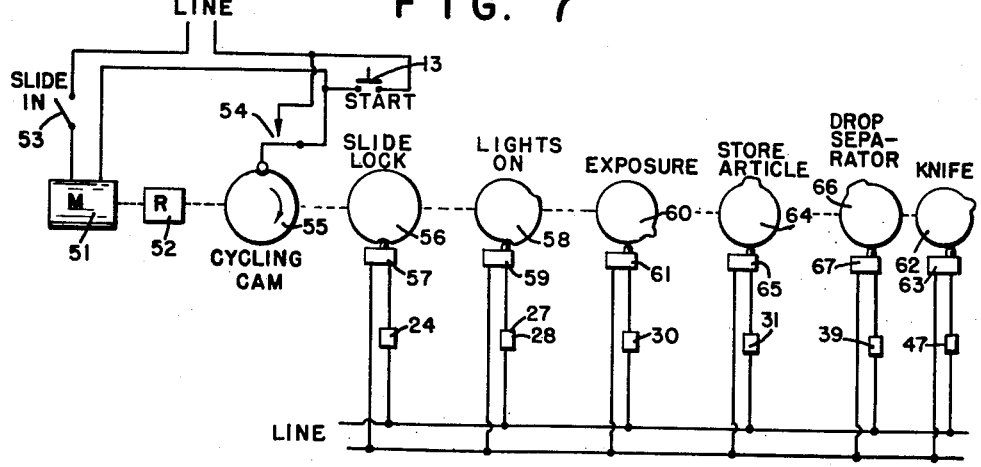
FIGURE 7 is a schematic electrical circuit diagram of the machine embodied in FIGURES 1 through 6.

FIGURE 7 shows the schematic circuit diagram for controlling the elements and the sequences to be accomplished. Motor 51 via gear reduction 52 drives a series of timing cams which control the various elements. In order to start motor 51, it is necessary that a slide sensing switch 53 (not shown in FIGURES 3 and 4) be in its closed position. This switch senses the slide in its "in" position and assures that the slide can be locked during operation of the machine. Upon momentary contact depressing of start button 13, motor 51 becomes energized and drives a series of timing cams.

Cam 55 operates a contact 54 and serves for the purpose of cycling the machine for one sequence. As soon as contact 54 is closed the circuit which includes the start pushbutton is bypassed until the depression in cycling cam 55 opens contact 54. Immediately after motor 51 is started, cam 56 closes switch 57 to cause locking solenoid 24 to lock the slide or access cover. Cam 58 via switch 59 controls illumination lamps 27 and 28. Cam 60 via switch 61 energizes a solenoid operatively connected to the shutter of the camera (not shown) and causes the motor 30 of the camera to operate. Cam 62 via switch 63 controls the rotary solenoid 47 to sever the ticket. Cam 64 via switch 65 energizes solenoid 31 to release the panel 21A and finally cam 66 via switch 67 operates solenoid 39 for dropping a separator 36 from container 35 into the receptacle 33.

It will be apparent to those skilled in the art that the operations timing and sequences may be adjusted and varied readily by moving the cams relative to one another and by adding or subtracting cams as the need arises.

Figure 6:
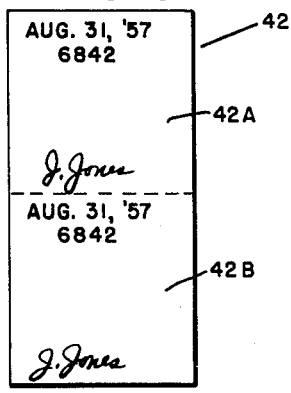
FIGURE 6 is a plan view illustrating a typical deposit slip and receipt.

As a variation of the foregoing apparatus the dual ticket shown in FIGURE 6 can readily comprise two individual deposit slips. One slip is inserted by the depositor with the article into the machine for storage, while the other slip is placed by the depositor in operative engagement with a validation or certification device which is exposed and accessible to the depositor. The validation device is actuated by the depository machine in response to photographic recording and/or storage of the article. After validation the depositor removes the validated slip from the device, the validated slip serving as his receipt.

FIGURE 8 is a front view of the machine bearing certain modifications, particularly a machine which requires pass means for rendering the machine operative. Numeral 131 identifies a slidable access door which is shown in its closed position toward the right, and which must be opened by sliding it toward the left in order to accomplish a deposit. A slot 132 permits insertion of certain pass means which are necessary to unlock the access door 131. A return chute 133 serves for returning to the depositor after the machine is in operation or has operated, the pass means inserted into the slot 132. Numeral 134 shows a start button mounted on the door which serves to energize the apparatus. It will be observed that this button is located on the movable access door and since the door is concealed when it is located toward the left, the door must be in its closed position to render the start pushbutton 134 operable by the depositor. The control means for starting the machine therefore is concealed from the depositor while the deposit is being placed into the machine and is rendered accessible only when the deposit has been rendered inaccessible.

FIGURES 9 and 10 illustrate a typical pass means which may be employed although it should be clearly understood that other pass means including keys, etc., may be used in order to render the machine operative. These pass means are of value in order to prevent unauthorized use and also to assure that the deposits can be made only by regular customers or otherwise recognized persons. As a typical example, pass means 136 comprises a flat plate which has certain embossings giving the name of the pass holder, an account number and other data which are deemed to be pertinent. In addition thereto, the plate is equipped with two raised embossings 137 and 138; the distance between the embossings, the height and configuration may be used for coding purposes. It will be apparent that chute 132 may be equipped with indexing means so that only recognized pass plates can be inserted into the chute. In general, the plate is similar to plates issued by department stores for charge account customers.

FIGURE 11 illustrates how this pass plate may be used for identification purposes within the machine after it has served to unlock the machine. Plate 136 is inserted through aperture 132 and comes to rest in operative position by means of a stop plate 140. A solenoid 141 is mounted underneath the position at which the identification plate comes to rest and is equipped at its front end with a plunger and a metal stamping means. When this plunger is raised by energizing solenoid 141 it will carry along with it the pass means and identification plate 136 and the raised portions in the plate will be used to imprint paper 142 with depositor identifying data as is well known in connection with charge accounts in stores, gasoline service stations, etc. Paper 142 in tape form is unwound from a drum 143 and is wound onto drum 144. By using paper in duplicate, one of the printed records can be kept within the depository machine and wound on drum 144 whereas a duplicate of the record slip 145 is available for issuance to the depositor. This receipt issues through an additional aperture on the front panel, FIGURE 11, directly above slot 132. Additional printing means 146 may be employed to serialize and date the deposit record slip in the well known manner. The advance of the paper and printing can be accomplished as is well understood by those skilled in the art of electrically operated cash registers where a record of the deposit is kept within the machine and a duplicate record is issued to the customer.

After the record has been made and a ticket is ready to issue to the depositor, solenoid 147 is energized which trips a latch and permits the support for the pass means together with solenoid 141 to pivot clockwise in the direction of the arrow, thus dropping the pass means into the mouth 148 of the chute and returning the pass plate to the depositor at the terminal point 133. As the plate passes through the chute, it trips a lever 149 which in turn causes actuation of a switch 150. This switch 150 energizes a mechanism (not shown) which causes the tray like arrangement onto which the pass means is placed, the printing solenoid 141, etc., to be returned to the position shown in FIGURE 11, thus completing the sequence of operation.

It will be apparent that the timing of these sequences can readily be arranged with timing cams as shown in connection with FIGURE 7 and that the modification in FIGURES 8 through 11 is merely a modification of rendering the machine operative and identifying the person making a deposit by automatic and standardized means.

Figure 12:
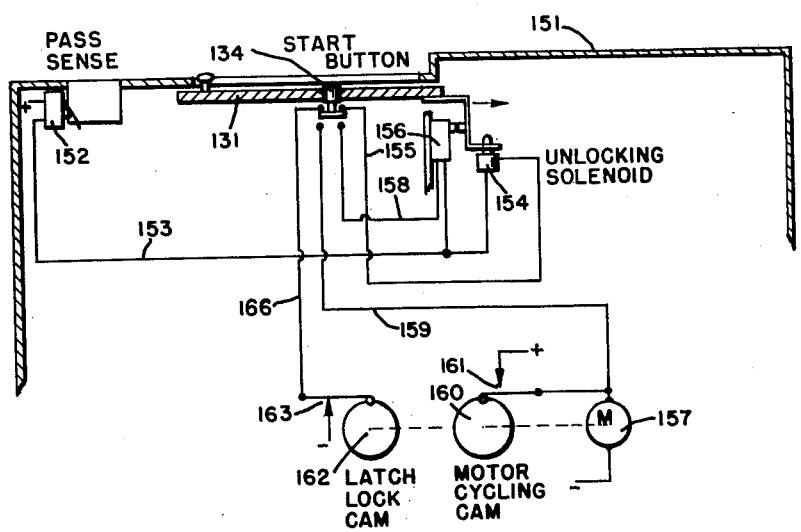
FIGURE 12 is a schematic electrical circuit diagram of the locking and unlocking arrangements for use in the machine when employing the pass means.

FIGURE 12 shows a schematic electrical circuit diagram of some of the interlocking features connected with the embodiment of the features described in FIGURES 8 through 11. The access door 131 is shown in its closed position. It will be observed that if the door is in its open position the start button being mounted to the door will disappear behind cover 151. Switch 152 senses the presence of pass means and is closed when pass means 136 (FIGURE 9) are inserted into the machine. As soon as this switch is tripped electrical circuit is established from the positive pole and switch 152 via conductor 153, unlocking solenoid 154, conductor 155, the upper set of switch contacts on start button 134, conductor 166 and switch contact 163 to the negative pole of the source of power. The energizing of solenoid 154 causes withdrawal of a plunger engaging a suitable aperture in the extension of door 131 thus permitting opening of the door and insertion of the deposit. After the deposit has been inserted the door is closed and full closing of the door is sensed by a limit switch 156 which causes a set of contacts to be closed when the door is fully closed. When depressing the start push button, motor 157 becomes energized as evidenced by following the circuit from the positive terminal at switch 152 via conductor 153, closed limit switch 156, conductor 158, the lower set of contacts on the start switch 134, conductor 159, motor 157 to the negative pole of the power supply. The start of the motor causes the motor cycling cam 160 to rotate and immediately circuit contact 161 becomes closed thus bypassing switches 152, 134, 156, etc., which become disabled for one complete cycle. In this condition it is required that unlocking solenoid 154 be disabled and the access door remain locked for the complete cycle. This requirement is met by cam 162 which, as soon as the motor rotates, opens a set of contacts, numeral 163, thereby breaking the circuit to unlocking solenoid 154, causing the latch to remain engaged in the corresponding aperture of door 131 extension.

It will be observed that in a manner similar to the circuit described before, the access door remains locked during the operation of the machine and that the deposit cannot be removed from the machine. At the same time pass means are employed in order to render the machine operative and to produce a printed record of the depositor identifying data.

Other modifications and further inventive features disclosed but not claimed are described in the copending application for U.S. Letters Patent identified heretofore.

While there have been described and illustrated certain specific embodiments of the invention and modifications thereof, it will be obvious that various further changes and alternate designs may be incorporated without departing from the field and spirit of the invention which should be limited only by the scope of the appended claims.

What is claimed is:

1. In a depository machine which includes image recording means and a storage receptacle disposed inaccessible to the depositor using the machine, the combination of: an enclosure; deposit acceptance means adapted to receive a deposit disposed in said enclosure; a slidable door forming a part of the enclosure and coacting therewith for selectively exposing and concealing said deposit acceptance means; manually operable switching means disposed accessible to the depositor when the door is concealing the acceptance means and disposed inaccessible to the depositor when the door is positioned for exposing the deposit acceptance means; a pass plate receiving aperture adapted to receive a pass plate provided with identifying indicia disposed on said enclosure; a receiving passage connected to said aperture for receiving the pass plate after insertion through the respective aperture; means for temporarily retaining the plate in the passage; sensing means disposed for sensing the presence of said plate in the passage and actuated in response to the plate being retained in the aperture; locking means adapted to coact between said door and said enclosure for normally maintaining said deposit acceptance means concealed; said locking means being operated in response to the actuation of said sensing means whereby to release the door and upon sliding motion thereof expose the normally concealed deposit acceptance means; image recording means disposed to view the deposit received at said deposit acceptance means and upon actuation, record an image of the deposit; means operable in response to the actuation of the image recording means for guiding the deposit from the acceptance means to the storage receptacle; a supply of receipt material disposed in the enclosure; receipt printing and issuing means disposed in said enclosure and adapted to receive said receipt material; guide means coacting with said issuing means for guiding a portion of the receipt material in proximity to said pass plate when the latter is retained in the passage; said printing means when actuated causing said pass plate to come in contact with said receipt portion for transferring thereto the identifying indicia; means disposed for releasing said pass plate from said passage to a position accessible from the exterior of the enclosure in response to the operation of said printing means; said receipt issuing means when actuated adapted to dispense said indicia carrying receipt portion to a position accessible from the exterior of the enclosure; control means connected to said receipt printing and issuing means, said image recording means and to said pass plate release means for causing operation of said respective means, and said manually operable switching when actuated causing operation of said control means when the door is positioned for concealing the deposit acceptance means.

2. A depository machine as set forth in claim 1 wherein the indicia provided on said pass plate are embossings.

3. A depository machine as set forth in claim 1 wherein means are provided to print a duplicate receipt which is retained in said enclosure.

References Cited in the file of this patent

UNITED STATES PATENTS

| 2,770,516 | Mestre | Nov. 13, 1956 |
| 2,963,333 | Mestre | Dec. 6, 1960 |

FOREIGN PATENTS

| 605,678 | Germany | Nov. 16, 1934 |